US011711729B2

(12) United States Patent
Shi et al.

(10) Patent No.: US 11,711,729 B2
(45) Date of Patent: *Jul. 25, 2023

(54) USER PLANE RELOCATION

(71) Applicant: InterDigital Patent Holdings, Inc., Wilmington, DE (US)

(72) Inventors: Xiaoyan Shi, Westmount (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,084

(22) Filed: Feb. 18, 2022

(65) Prior Publication Data
US 2022/0174554 A1 Jun. 2, 2022

Related U.S. Application Data

(63) Continuation of application No. 16/624,104, filed as application No. PCT/US2018/038228 on Jun. 19, 2018, now Pat. No. 11,259,215.
(Continued)

(51) Int. Cl.
*H04W 36/12* (2009.01)
*H04W 36/00* (2009.01)

(52) U.S. Cl.
CPC ........... *H04W 36/00* (2013.01); *H04W 36/12* (2013.01)

(58) Field of Classification Search
CPC . H04W 36/12; H04W 48/18; H04W 36/0011; H04W 36/00; H04W 36/32;
(Continued)

(56) References Cited

U.S. PATENT DOCUMENTS 9,002,999 B2 * 4/2015 Lee ................. H04L 67/148
709/227
2006/0178135 A1 * 8/2006 Jiang ................ H04M 3/42042
455/414.1
(Continued)

FOREIGN PATENT DOCUMENTS

CN 104137608 A 11/2014
EP 2515560 A1 * 10/2012 ............ H04W 48/20
(Continued)

OTHER PUBLICATIONS

3rd Generation Partnership Project; Technical Specification Group Services and System Aspects; System Architecture for the 5G System; Stage 2, (Release 15), 3GPP TS 23.501 V1.0.0, Jun. 2017, 146 pages.
(Continued)

*Primary Examiner* — Nathan S Taylor
(74) *Attorney, Agent, or Firm* — Condo Roccia Koptiw LLP

(57) ABSTRACT

Systems, methods, and instrumentalities are disclosed for an access control and mobility management function (AMF) node, comprising a processor configured to receive a N2 session management (SM) information from a session management function (SMF) node, wherein the N2 SM information indicates an available area for N2 information, receive a service request from a wireless transmit receive unit (WTRU), determine whether to update the N2 SM information based on a location of the WTRU and the available area for N2 information, wherein if the WTRU is outside of the available area for N2 information, the processor is configured to request a second N2 SM information from the SMF node and update the N2 SM information with the second N2 SM information, and send an N2 request with the N2 SM information to an access network associated with the WTRU. The available area for N2 information may be
(Continued)

one or more of a user plane function (UPF) node serving area, a WTRU tracking area, or a radio access network (RAN) cell coverage area.

14 Claims, 17 Drawing Sheets

Related U.S. Application Data

(60) Provisional application No. 62/521,878, filed on Jun. 19, 2017.

(58) Field of Classification Search
CPC . H04W 48/16; H04W 76/11; H04W 36/0033; H04W 76/12; H04W 76/19; H04W 80/10; H04W 8/08; H04W 28/0226; H04W 36/28; H04W 48/14; H04W 72/0406; H04W 76/15; H04W 76/18; H04W 76/30; H04W 76/32; H04W 76/38; H04W 84/045; H04W 88/06; H04W 8/18
See application file for complete search history.

(56) References Cited

U.S. PATENT DOCUMENTS

| | | | |
|---|---|---|---|
| 2014/0051443 A1* | 2/2014 | Diachina | H04W 36/0022 455/436 |
| 2016/0345262 A1* | 11/2016 | Jain | H04W 52/0235 |
| 2017/0311290 A1 | 10/2017 | Adjakple et al. | |
| 2018/0192390 A1* | 7/2018 | Li | H04W 60/04 |
| 2018/0198867 A1* | 7/2018 | Dao | H04L 67/14 |
| 2018/0270778 A1* | 9/2018 | Bharatia | H04L 65/80 |
| 2018/0279397 A1* | 9/2018 | Faccin | H04W 48/14 |
| 2018/0352483 A1* | 12/2018 | Youn | H04W 76/11 |
| 2018/0376384 A1* | 12/2018 | Youn | H04W 92/02 |
| 2018/0376444 A1* | 12/2018 | Kim | H04W 4/70 |
| 2019/0029065 A1* | 1/2019 | Park | H04W 48/02 |
| 2019/0059067 A1* | 2/2019 | Lee | H04W 28/10 |
| 2019/0075511 A1* | 3/2019 | Ryu | H04W 68/005 |
| 2019/0246342 A1* | 8/2019 | Wang | H04W 60/00 |
| 2019/0357129 A1* | 11/2019 | Park | H04W 60/04 |
| 2019/0364541 A1* | 11/2019 | Ryu | H04W 80/10 |
| 2019/0373441 A1* | 12/2019 | Ryu | H04W 48/18 |
| 2020/0053636 A1* | 2/2020 | Mas Rosique | H04M 15/66 |
| 2020/0077356 A1* | 3/2020 | Youn | H04W 68/02 |
| 2020/0100095 A1* | 3/2020 | Tang | H04W 80/10 |
| 2020/0112898 A1* | 4/2020 | Ramle | H04W 8/08 |
| 2020/0120570 A1* | 4/2020 | Youn | H04W 76/11 |
| 2020/0120589 A1* | 4/2020 | Velev | H04W 48/18 |
| 2020/0145953 A1* | 5/2020 | Youn | H04W 60/04 |
| 2020/0383160 A1* | 12/2020 | Faccin | H04W 48/14 |
| 2021/0092668 A1* | 3/2021 | Zaus | H04W 8/02 |

FOREIGN PATENT DOCUMENTS

| | | |
|---|---|---|
| WO | 2013/184225 A1 | 12/2013 |
| WO | WO-2018236830 A1 * 12/2018 | ........ H04W 36/0011 |

OTHER PUBLICATIONS

3rd Generation Partnership Project; Technical Specification Group Services and System Aspects; Procedures for the 5G System; Stage 2, ((Release 15), 3GPP TS 23.502 V0.4.0, May 2017, 126 pages.

3rd Generation Partnership Project (3GPP), S2-173005, "Description of SM Information and POU Session ID on N11 and N1", Ericsson, SA WG2 Meeting #121, Hangzhou, China, May 15-19, 2017, pp. 1-27.

3rd Generation Partnership Project (3GPP), S2-173112, "23.501— Minimizing the Need for POU Session Re-Establishment due to UE Mobility and UPF Relocation", Qualcomm Incorporated, SA WG2 Meeting #S2-120, Hangzhou, P. R. China, May 15-19, 2017, pp. 1-6.

3rd Generation Partnership Project (3GPP), S2-173161, "TS 23.502 Call Flow for EPC → 5GC Interworking", Nokia, Alcatel-Lucent, SA WG2 Meeting #120, Busan, Korea, Mar. 27-31, 2017, pp. 1-3.

3rd Generation Partnership Project (3GPP), S2-173392, "Network-Initiated Service Request for Non-3GPP Access", Huawei, HiSilicon, 3GPP TSG SA WG2 Meeting#121, Hangzhou, China, May 15-19, 2017, pp. 1-4.

3rd Generation Partnership Project (3GPP), TS 23.501 V0.4.0, "Technical Specification Group Services and System Aspects, System Architecture for the 5G System, Stage 2 (Release 15)", Apr. 2017, pp. 1-124.

3rd Generation Partnership Project (3GPP), TS 23.502 V0.3.0, "Technical Specification Group Services and System Aspects, Procedures for the 5G System, Stage 2 (Release 15)", Mar. 2017, pp. 1-115.

\* cited by examiner

USER PLANE RELOCATION

CROSS-REFERENCE TO RELATED APPLICATIONS

This application is a continuation of U.S. patent application Ser. No. 16/624,104, now U.S. Pat. No. 11,259,215, which is the National Stage entry under 35 U.S.C. § 371 of Patent Cooperation Treaty Application PCT/US2018/038228, which claims priority to U.S. Provisional Patent Application No. 62/521,878 filed on Jun. 19, 2017, the entire contents of which are hereby incorporated by reference herein.

BACKGROUND

Wireless communication systems continue to evolve. A new fifth generation may be referred to as 5G. An example of a previous generation of mobile communication system may be referred to as fourth (4G) long term evolution (LTE).

SUMMARY

Systems, methods, and instrumentalities are disclosed for an access control and mobility management function (AMF) node, comprising a processor configured to receive a N2 session management (SM) information from a session management function (SMF) node, wherein the N2 SM information indicates an available area for N2 information, receive a service request from a wireless transmit receive unit (WTRU), determine whether to update the N2 SM information based on a location of the WTRU and the available area for N2 information, wherein if the WTRU is outside of the available area for N2 information, the processor is configured to request a second N2 SM information from the SMF node and update the N2 SM information with the second N2 SM information, and send an N2 request with the N2 SM information to an access network associated with the WTRU. The available area for N2 information may be one or more of a user plane function (UPF) node serving area, a WTRU tracking area, or a radio access network (RAN) cell coverage area.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
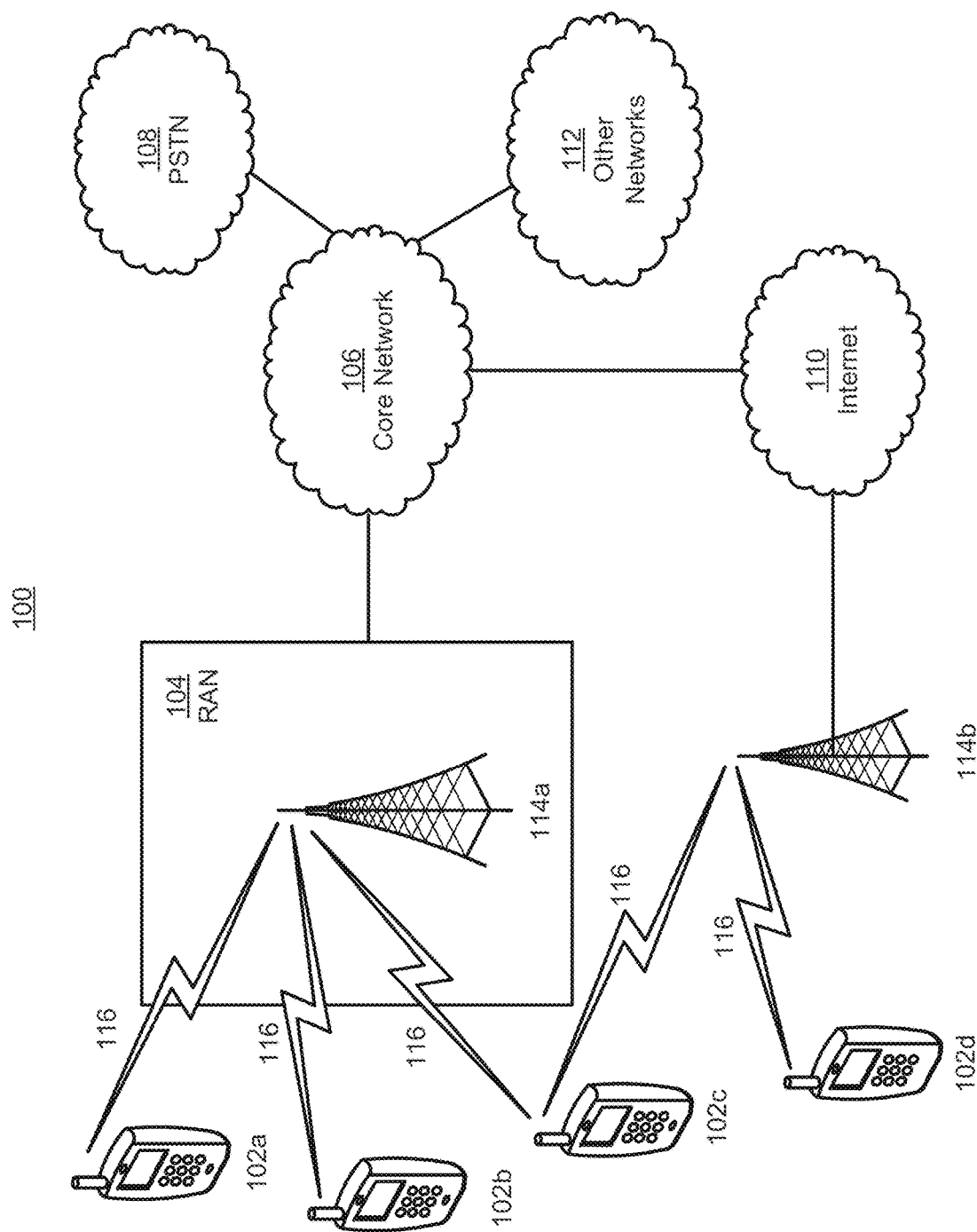
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include abase station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in director indirect communication with other RANs that employ the same RAT as the RAN 104/113 or a different RAT.

For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
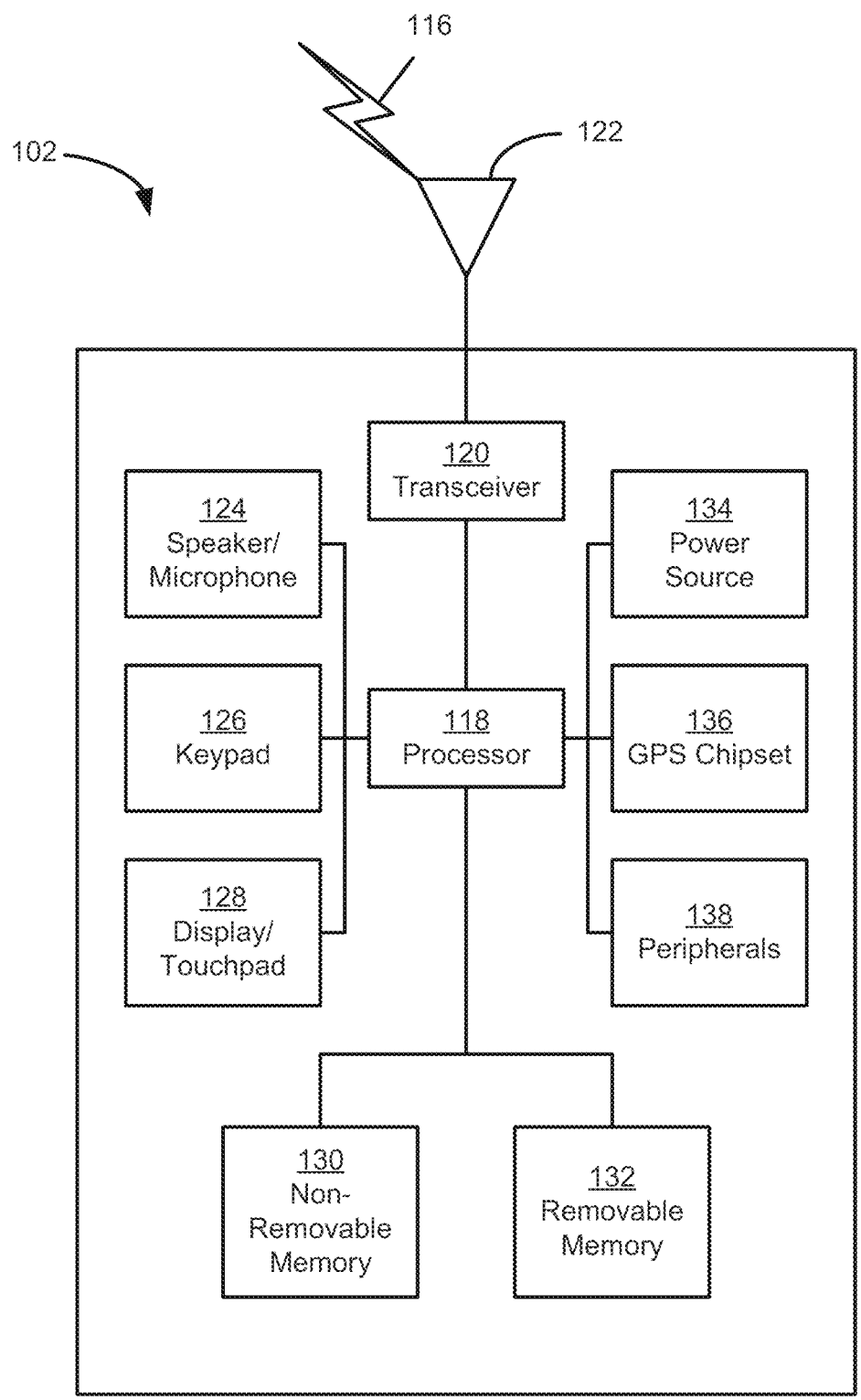
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs). Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
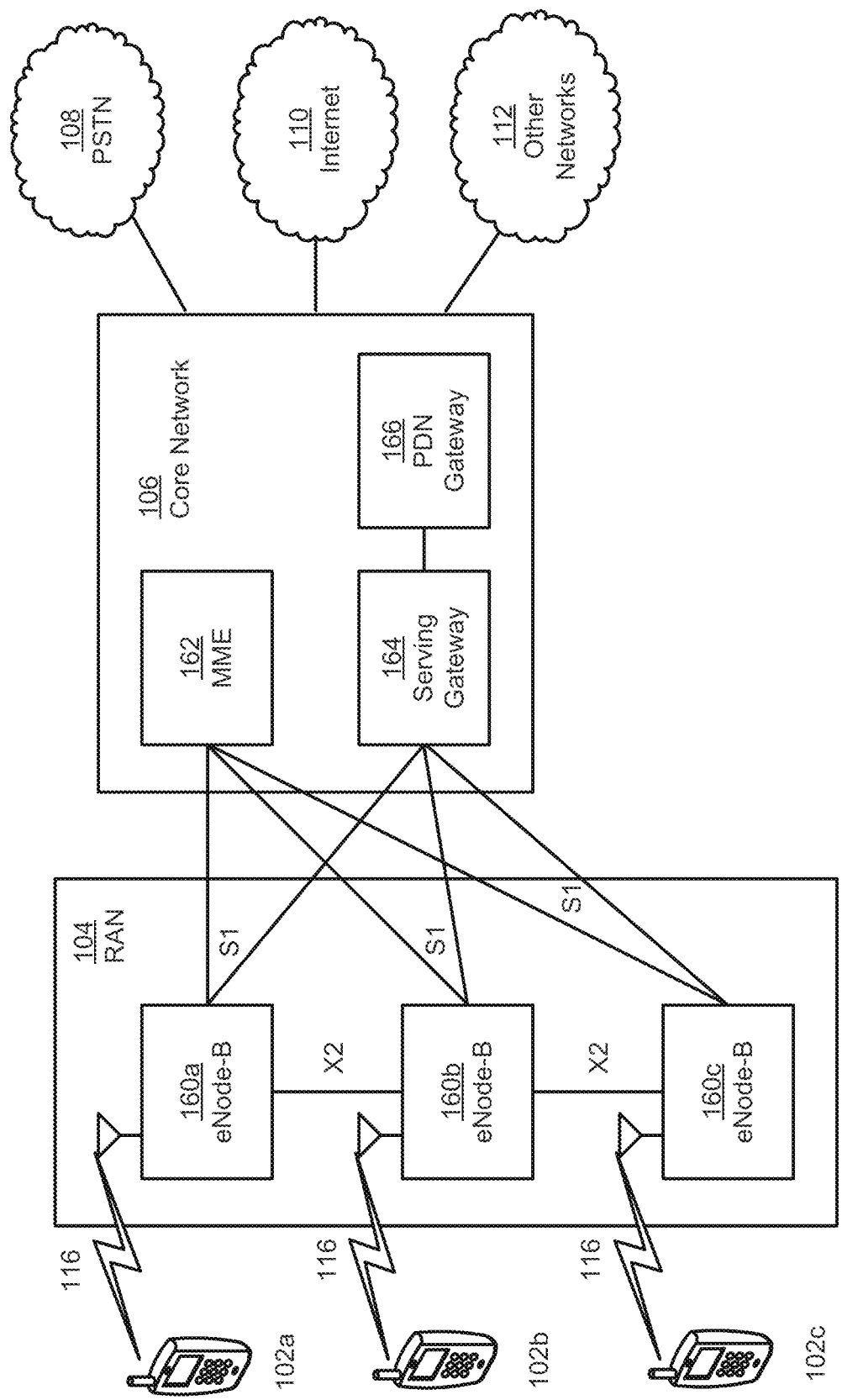
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e LS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz. 2 MHz, 4 MHz, 8 MHz. and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n. 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz. 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
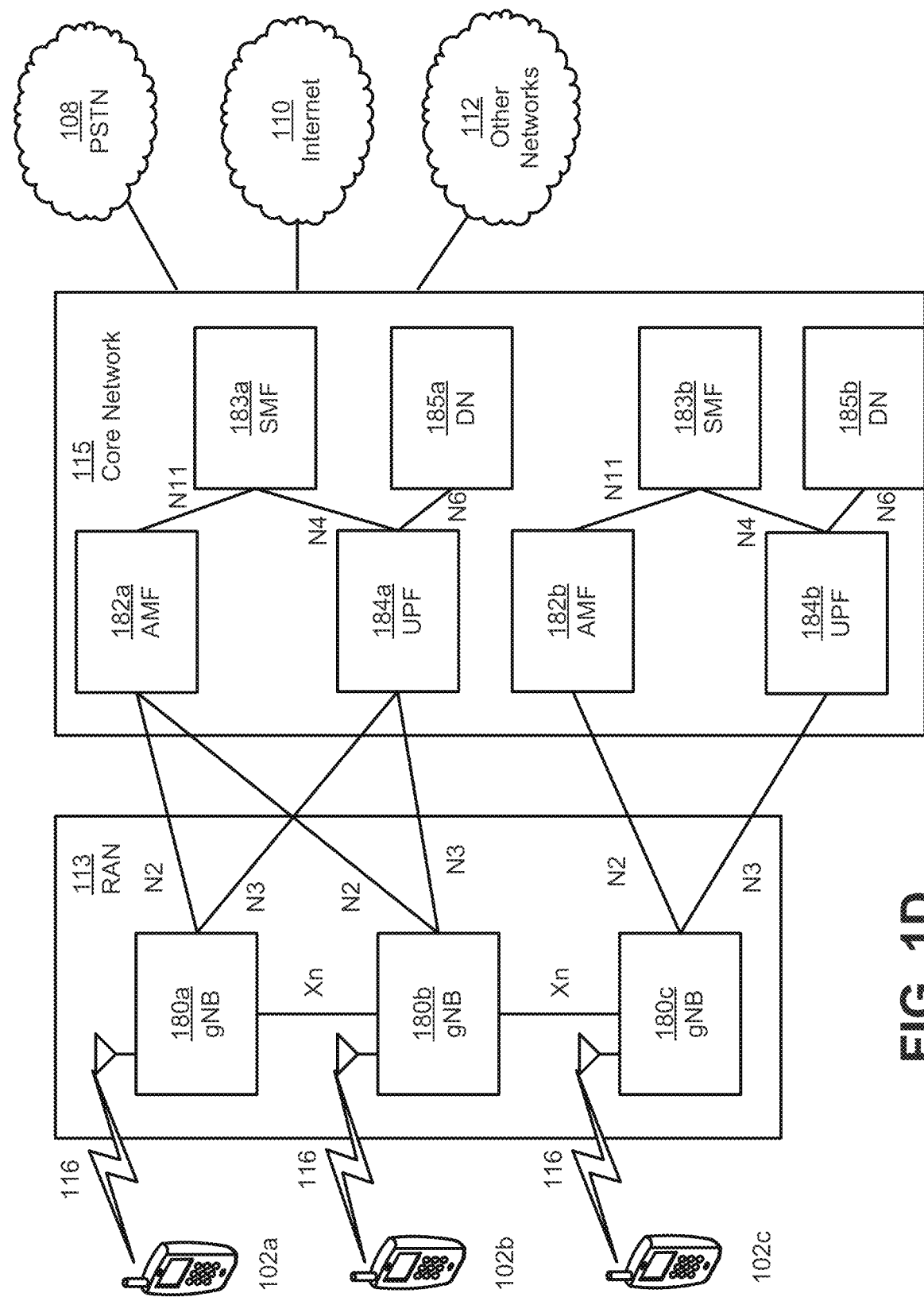
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carder aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b. 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a. 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b. 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b. 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of WTRU 102a-d, Base Station 114a-b, eNode-B 160a-c, MME 162, SGW 164, PGW 166, gNB 180a-c, AMF 182a-ab, UPF 184a-b. SMF 183a-b. DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network.

The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

Figure 2:
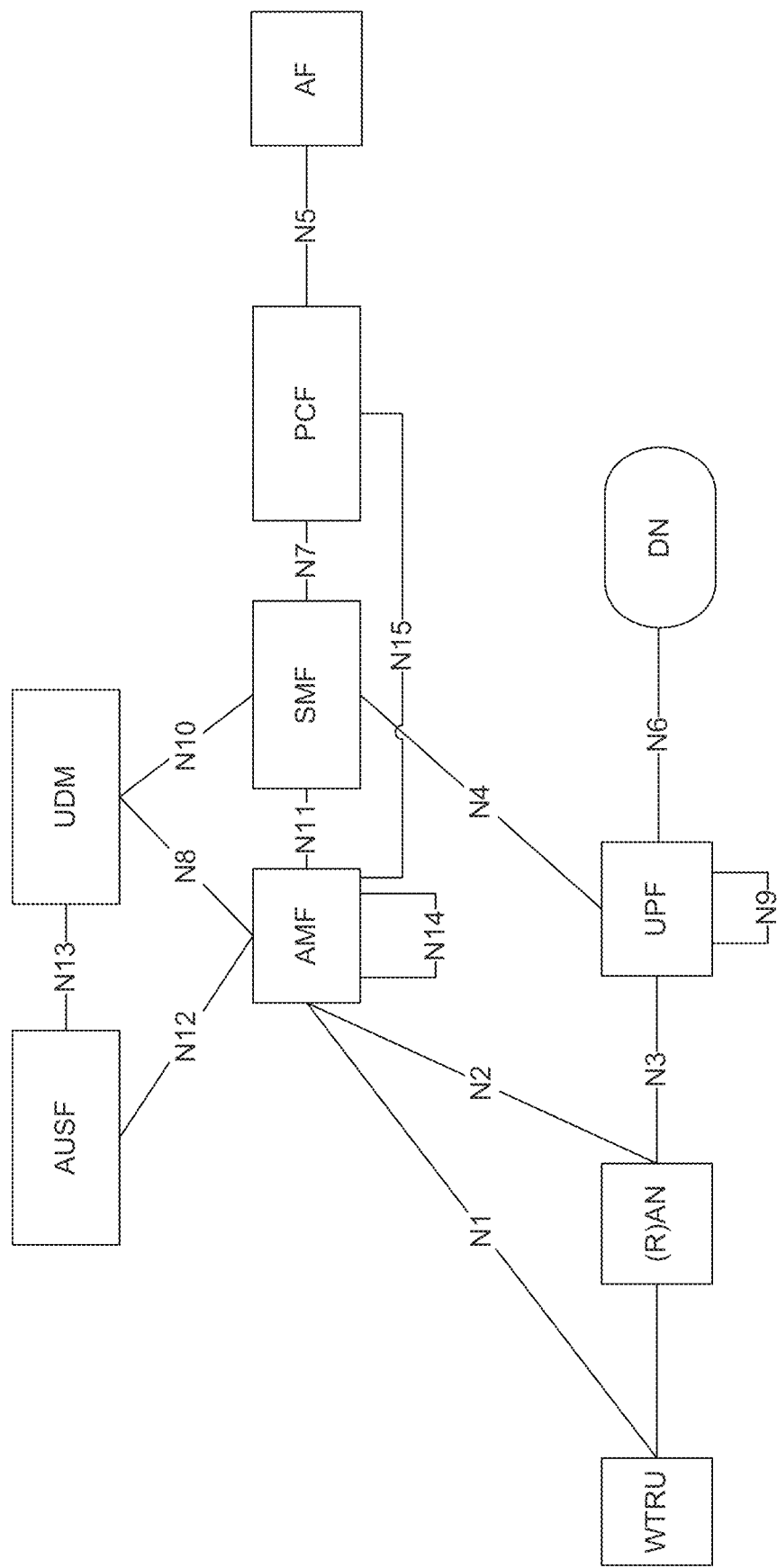
FIG. 2 illustrates an example model of an architecture for a 5G and/or a next generation (NextGen) network.

An example 5G network may be described herein. FIG. 2 illustrates an example architecture for a 5G and/or a next generation (NextGen) network. In FIG. 2, a radio access network (RAN) may refer to a radio access network based on 5G radio access technology (RAT) and/or Evolved E-UTRA that may connect to the NextGen core network. An access control and mobility management function (AMF) may include one or more of the following functionalities: registration management, connection management, reachability management, mobility management, and/or the like. A session management function (SMF) may include one or more of the following functionalities: session management (e.g., which may include session establishment and/or modify and release), wireless transmit/receive unit (WTRU) internet protocol (IP) address allocation, selection and control of user plane (UP) function, and/or the like. A user plane function (UPF) may include one or more of the following functionalities: packet routing and forwarding, packet inspection, traffic usage reporting, and/or the like.

UPF and/or SMF relocation may be described herein. In deployment, a 5G network may include one or more of UPFs and/or SMFs. Each UPF and/or SMF may serve an area (e.g., a specific area). During the WTRU's mobility, if the WTRU moves out of the current UPF and/or SMF serving area, the network may assign one or more other UPFs and/or SMFs to serve the WRU. In some scenarios described herein, a first UPF (or SMF) may be described as an anchor UPF (or SMF), and a subsequent UPF (or SMF) (e.g., based on mobility) may be described as an intermediate UPF (or SMF).

Figure 3:
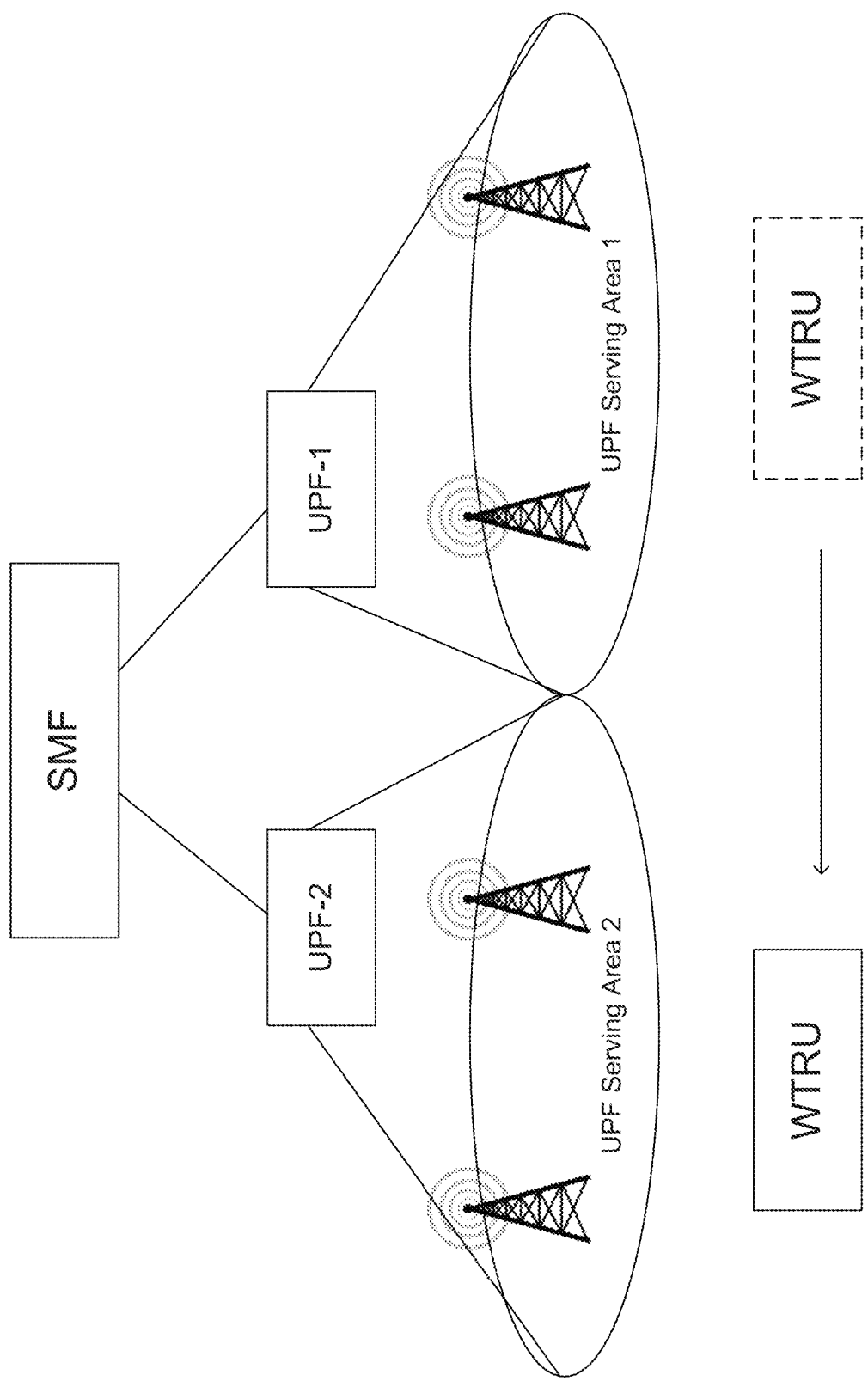
FIG. 3 illustrates an example user plane function (UPF) relocation due to WTRU mobility where the UPF relocation is performed without a session management function (SMF) change.

A UPF may change (e.g., based on mobility) without a corresponding SMF change, as can be seen in FIG. 3. FIG. 3 illustrates an example UPF relocation due to WTRU mobility where the UPF relocation is performed without a SMF change. Procedures for UPF relocation without SMF change may be described herein. As shown in FIG. 3, a WTRU in a UPF servicing area 1 may establish a protocol data unit (PDU) session with a UPF-1. The WTRU may move to a UPF serving area 2, where the (e.g., previous) RAN may not be able to contact the UPF-1 (e.g., directly). The network may assign a UPF-2 to serve the WTRU.

If the network maintains the PDU session continuity, the network may assign the UPF-2 as an intermediate node and may establish a tunnel between the UPF-2 and the UPF-1. One or more (e.g., all) data packets between the UPF-1 and the WTRU may be forwarded by the UPF-2. The UPF that originally served the PDU session (e.g., UPF-1) may be referred to as an anchor-UPF (A-UPF), and the UPF that was assigned by the network due to WTRU mobility (e.g., UPF-2) may be referred to as an intermediate-UPF (1-UPF).

If the network does not maintain the PDU session continuity, the network may notify the WTRU to re-establish the PDU session and may assign the UPF-2 as an anchor node of the new PDU session. The old PDU session (e.g., old PDU session associated with the UPF-1) may be released.

Figure 4:
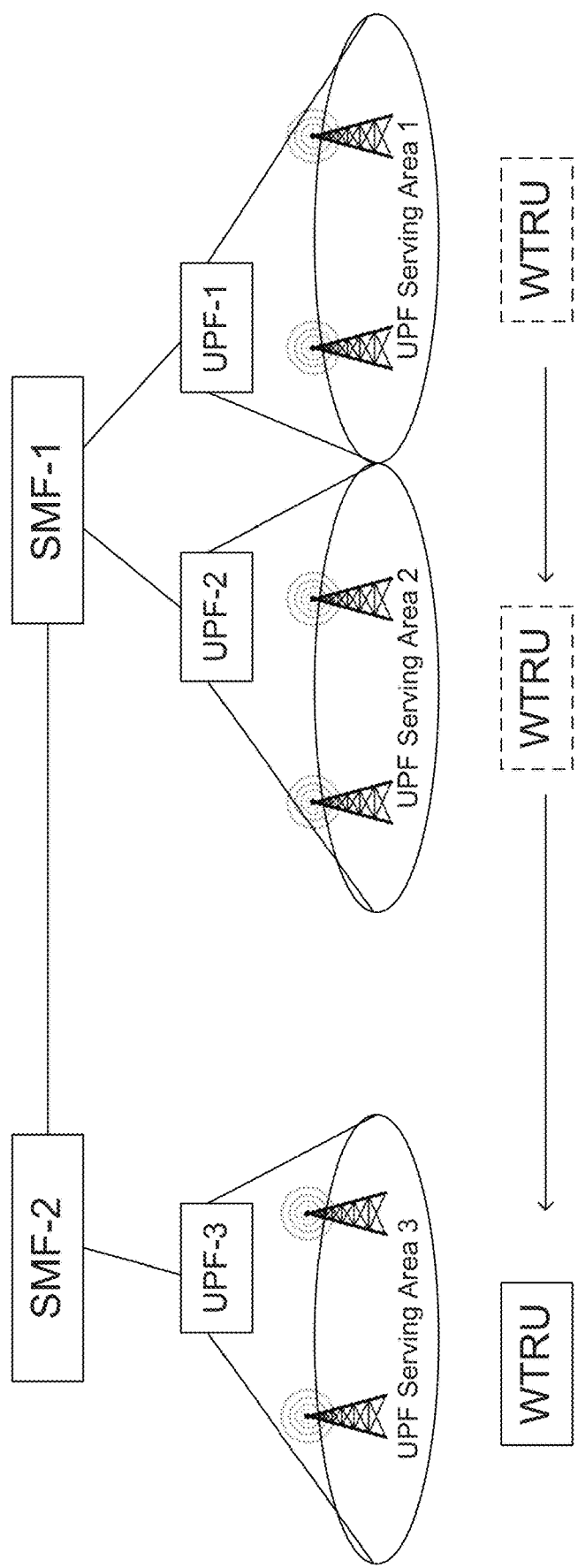
FIG. 4 illustrates an example UPF relocation due to WTRU mobility where the UPF relocation is performed with a SMF change.

Procedures for UPF relocation with SMF change may be described herein. FIG. 4 illustrates an example UPF relocation due to WTRU mobility where the UPF relocation is performed with a SMF change. If the WTRU moves to a UPF serving area 3, where the UPF-3 is unable to be controlled by the SMF-1, the network may assign the SMF-2 to control the UPF-3 for the WTRU's PDU session. If the network assigns the SMF-2 to control the UPF-3, a tunnel may be established between the UPF-3 (e.g., I-UPF) and the UPF-1 (e.g., A-UPF). One or more (e.g., all) data packets between the UPF-1 (e.g., A-UPF) and the WTRU may be forwarded by the UPF-3 (e.g., 1-UPF). The SMF-2 may be referred to as an intermediate SMF (e.g., I-SMF), which controls the I-UPF. The SMF-1 may be referred to as an anchor SMF (e.g., A-SMF), which may control the A-UPF.

The AMF may communicate with an SMF, which may, in turn, communicate with a UPF. In examples where anchor and intermediate SMFs and UPFs are present, one or more architectures may be provided, for example based on the interaction between the AMF and the SMF.

Figure 5:
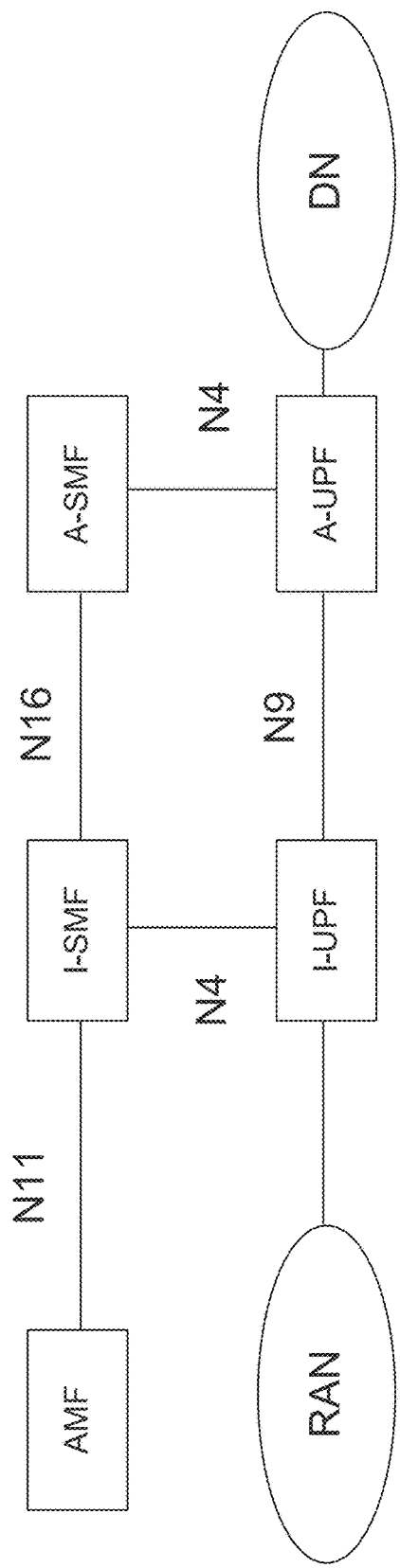
FIG. 5 illustrates an example architecture with one or more SMFs, where an access control and mobility management function (AMF) may select and/or communicate with an intermediate SMF (I-SMF).

FIG. 5 illustrates an example architecture with multiple SMFs. For example, an AMF may select and/or communicate with an I-SMF. One or more (e.g., all) session management (SM) non-access stratum (NAS) messages received from a WTRU (not depicted) may be sent to the I-SMF by the AMF. The I-SMF may cooperate with the A-SMF, e.g., to control the data plane.

Figure 6:
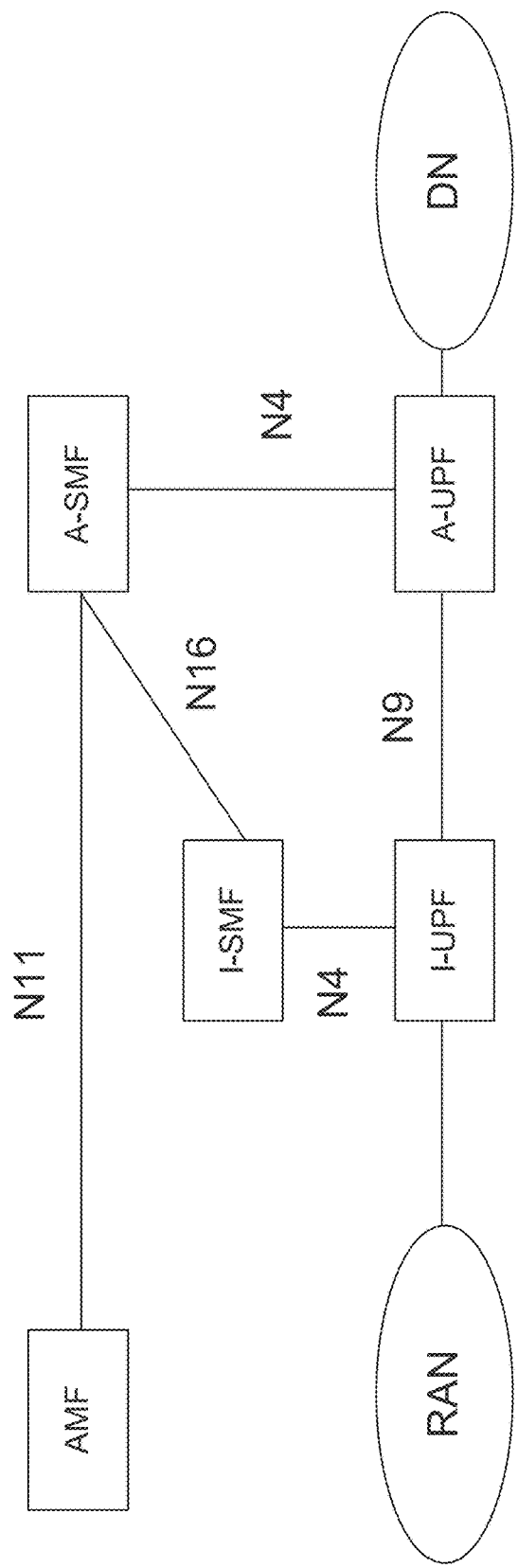
FIG. 6 illustrates an example architecture with one or more SMFs, where an AMF may communicate with an anchor SMF (A-SMF).

FIG. 6 illustrates an example architecture with multiple SMFs. For example, an AMF may select and/or communicate with an A-SMF. One or more (e.g., all) SM NAS message received from a WTRU (not depicted) may be sent to the A-SMF by the AMF. The A-SMF may cooperate with the I-SMF, e.g., to control the data plane.

Figure 7:
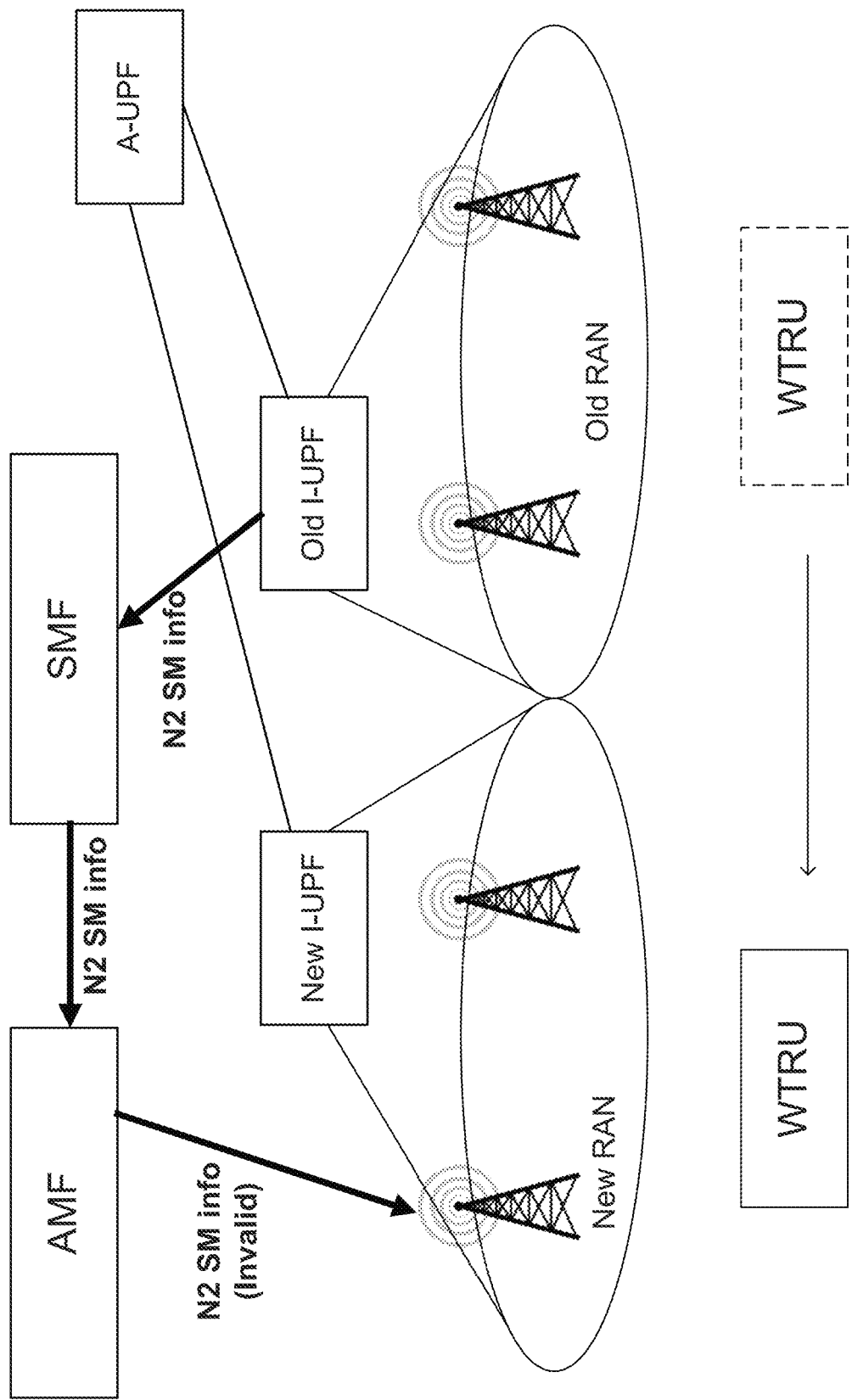
FIG. 7 illustrates an example of an invalid data path occurring in a UPF relocation due to WTRU mobility in idle mode.

During a network-triggered service request, an invalid data path in the UPF relocation may occur. FIG. 7 illustrates an example of an invalid data path occurring in a UPF relocation due to WTRU mobility in an idle mode. For example, in a network-triggered (NW-triggered) service request procedure, an SMF may send UPF information to the current RAN via the AMF. The WTRU may perform a service request procedure (e.g., in response to being paged). Upon waking, the WTRU may enter connected mode and report its location. The SMF may re-allocate the UPF (e.g., switch to a new I-UPF from an old 1-UPF). In some examples, the SMF may send N2 SM information (e.g., which may include an I-UPF tunnel information) in a N11 message to the AMF. If the SMF sends the AMF N2 SM information related to the old I-UPF (e.g., before the WTRU service request and/or before UPF re-allocation), and if the AMF sends the RAN the N2 SM information (e.g., related to the old 1-UPF), the data path may be invalid (e.g., the RAN may not be able to establish a tunnel to the old I-UPF).

The numbers/elements shown in call flows may be presented for the purpose of reference. As such, the numbered actions may be performed in a different order (e.g., in whole or in part) and/or some actions may be skipped.

Figure 8:
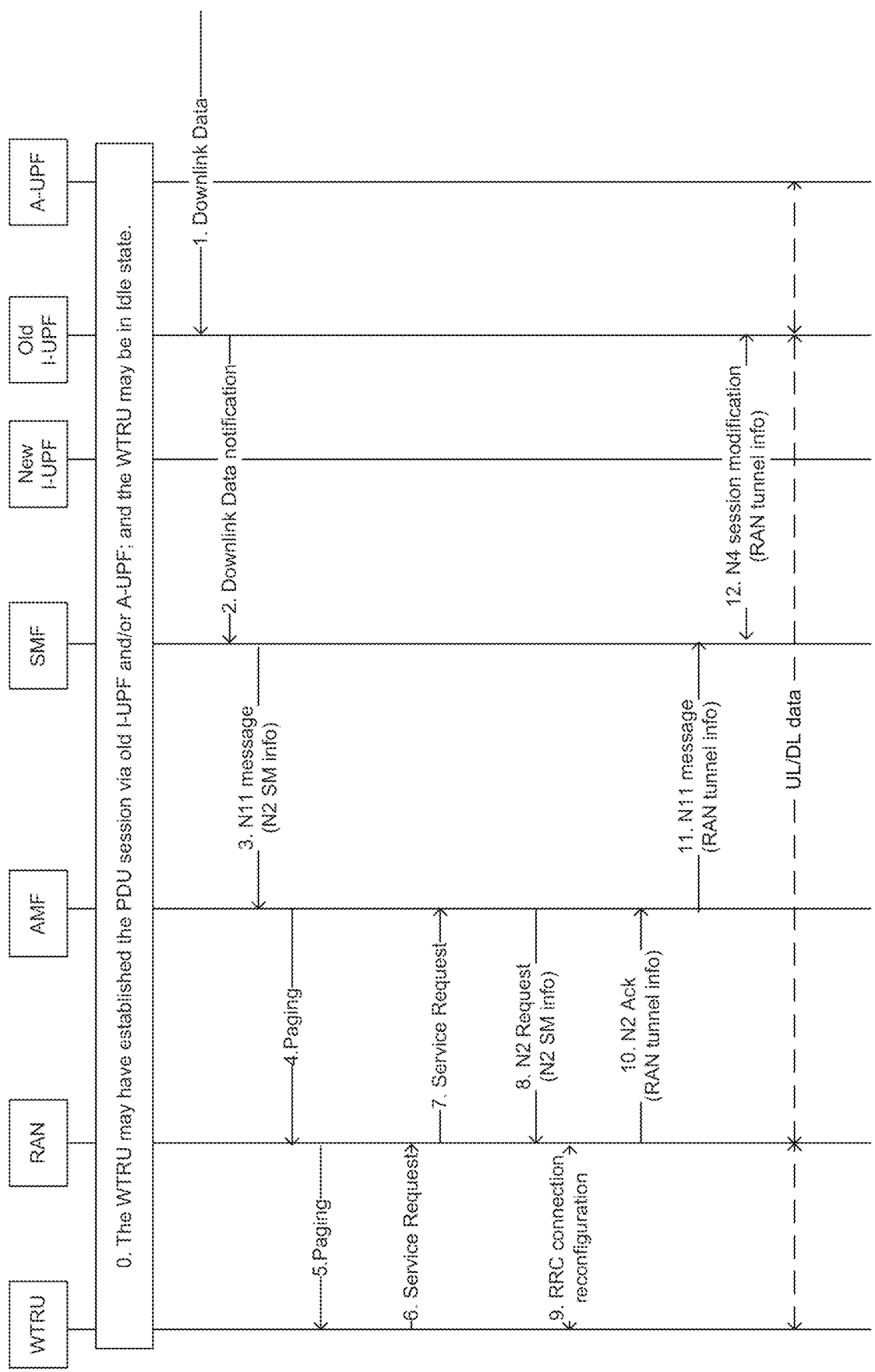
FIG. 8 illustrates an example network-triggered service request procedure.

FIG. 8 illustrates an example network-triggered (NW-triggered) service request procedure. When the WTRU is in idle state (e.g., at 0 of FIG. 8) and the I-UPF receives downlink data of the PDU session (e.g., at 1), the network may initiate the NW-triggered service request procedure by paging the WTRU and/or establishing the PDU data path.

A WTRU may move out of a serving area (e.g., a serving area of the old I-UPF) when the WTRU is in idle state. If the WTRU moves out of the serving area of the old I-UPF when the WTRU is in idle state, the tunnel established in the exemplary procedures shown in FIG. 8 (e.g., between the RAN and the old I-UPF) may not be established correctly. For example, the tunnel established between the RAN and the old I-UPF may not be established correctly because the RAN, which is serving the WTRU, may not be able to communicate with the old I-UPF. One or more WTRU's packets may be discarded if the tunnel is not established correctly.

Signaling (e.g., extra signaling) in UPF relocation with SMF change when a WTRU is idle may occur. When a WTRU enters idle state, the data path of the PDU session between the RAN and I-UPF may be released, and the data path between the I-UPF and A-UPF may be kept. For example, in the example architecture shown in FIG. 5, if the WTRU moves out of the I-SMF serving area during the WTRU mobility (e.g., to a serving area of new I-SMF (not depicted)), the AMF may select a new I-SMF, and the new I-SMF may initiate one or more N9 data path switch procedures. For example, the N9 data path switch procedure may select a new I-UPF and may update the A-UPF (e.g., the N9 tunnel information stored in the A-UPF).

The WTRU may be in idle state without a data packet. The WTRU may continue moving out of the new I-UPF service area (e.g., the N9 data path switch procedure may not be needed). One or more N9 data path switch procedures described herein may be skipped (e.g., to decrease extra unnecessary messages).

The I-SMF and/or A-SMF described in FIG. 5 and FIG. 6 may handle one or more different messages from/to the AMF. For example, the I-SMF may generate a N11 message for downlink data notification (e.g., since the I-UPF may be controlled by the I-SMF). The A-SMF may handle a resource request message from the AMF (e.g., since the A-SMF may be an endpoint communicating with the policy frame work and/or charging system).

An SMF (e.g., I-SMF for FIG. 5 architecture or A-SMF for FIG. 6 architecture) may communicate (e.g., directly) with the AMF. For one or more SMFs architecture shown in FIG. 5, one or more (e.g., all) the resource request related messages from the AMF may (e.g., must) be passed by the I-SMF to the A-SMF. For one or more SMFs architecture shown in FIG. 6, one or more (e.g., all) service request related messages from the I-SMF may (e.g., must) be passed by the A-SMF to the AMF.

UPF relocation during network-triggered service requests may be implemented.

For example, when downlink data notification is received from a I-UPF and if a SMF is unable to determine whether the UPF will be relocated, the SMF may not send N2 SM information (e.g., which may include an I-UPF tunnel information) in a N11 message to the AMF. The AMF may initiate a paging procedure to a WTRU. If the AMF receives a service request from the WTRU and the AMF has not received N2 SM information from the SMF, the AMF may provide the WTRU location to the SMF. The SMF may send N2 SM information (e.g., when the UPF relocates).

Figure 9:
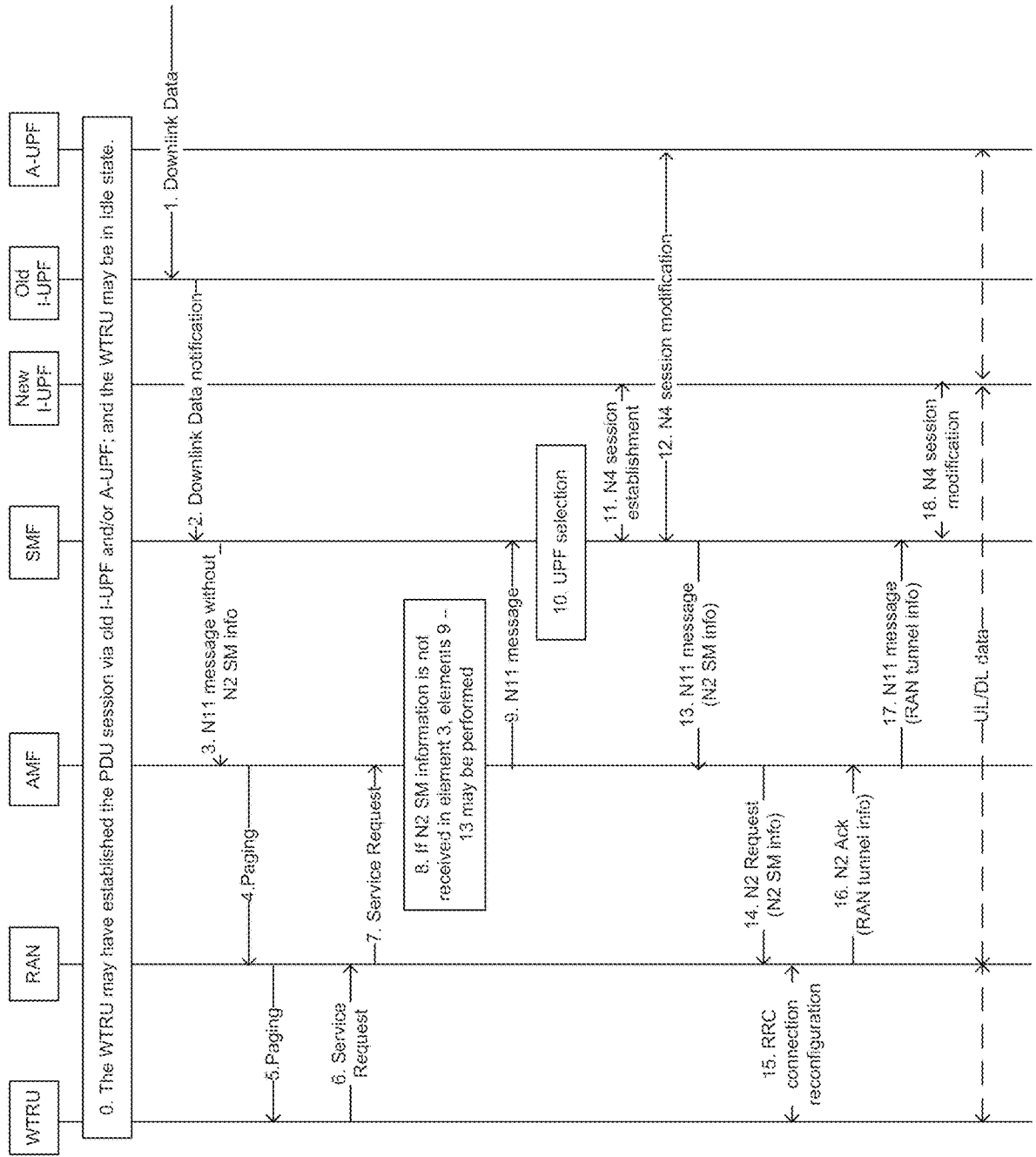
FIG. 9 illustrates an example UPF relocation during the network triggered service request procedure.

FIG. 9 illustrates an example UPF relocation during the network triggered service request procedure. The WTRU may have established a PDU session via old I-UPF and A-UPF, and the WTRU may be in idle state (e.g., at 0).

An old I-UPF may receive a downlink (DL) data of the PDU session (e.g., at 1). The old I-UPF may notify the SMF of DL data event (e.g., at 2). The SMF may send a N11 message to indicate that DL data is received (e.g., at 3). The SMF may not be able to determine if the WTRU is in the serving area of the UPF (e.g., since the SMF may not be aware of the current location of the WTRU). If the SMF is not able to determine whether the UPF will be relocated, the SMF may not include N2 SM information (e.g., in a N11 message).

The SMF may include a WTRU location request indication to request (e.g., request explicitly) the WTRU AMF to perform one or more procedures associated with the WTRU location (e.g., at 9-13). The AMF may perform the paging procedure (e.g., in 4 and/or 5). The WTRU may send a service request to the AMF (e.g., in 6 and/or 7). The RAN may include the WTRU location to the message. The AMF may determine whether to request SM information (e.g., N2 SM information) from the SMF (e.g., at 9-13) based on whether the SM information (e.g., N2 SM information) is received, for example in 3. If the N2 SM information is not received, the AMF may proceed with sending a N11 message to the SMF (e.g., at 9). If the N2 SM information is received, one or more of procedures/messaging from 9 to 13 may be skipped. The AMF may send a N11 message with the WTRU location to the SMF (e.g., at 9). The SMF may determine whether the I-UPF is relocated according to the WTRU location and may update the N4 session with the A-UPF (e.g., at 10-12). The data path may be established (e.g., at 13-18).

Figure 10:
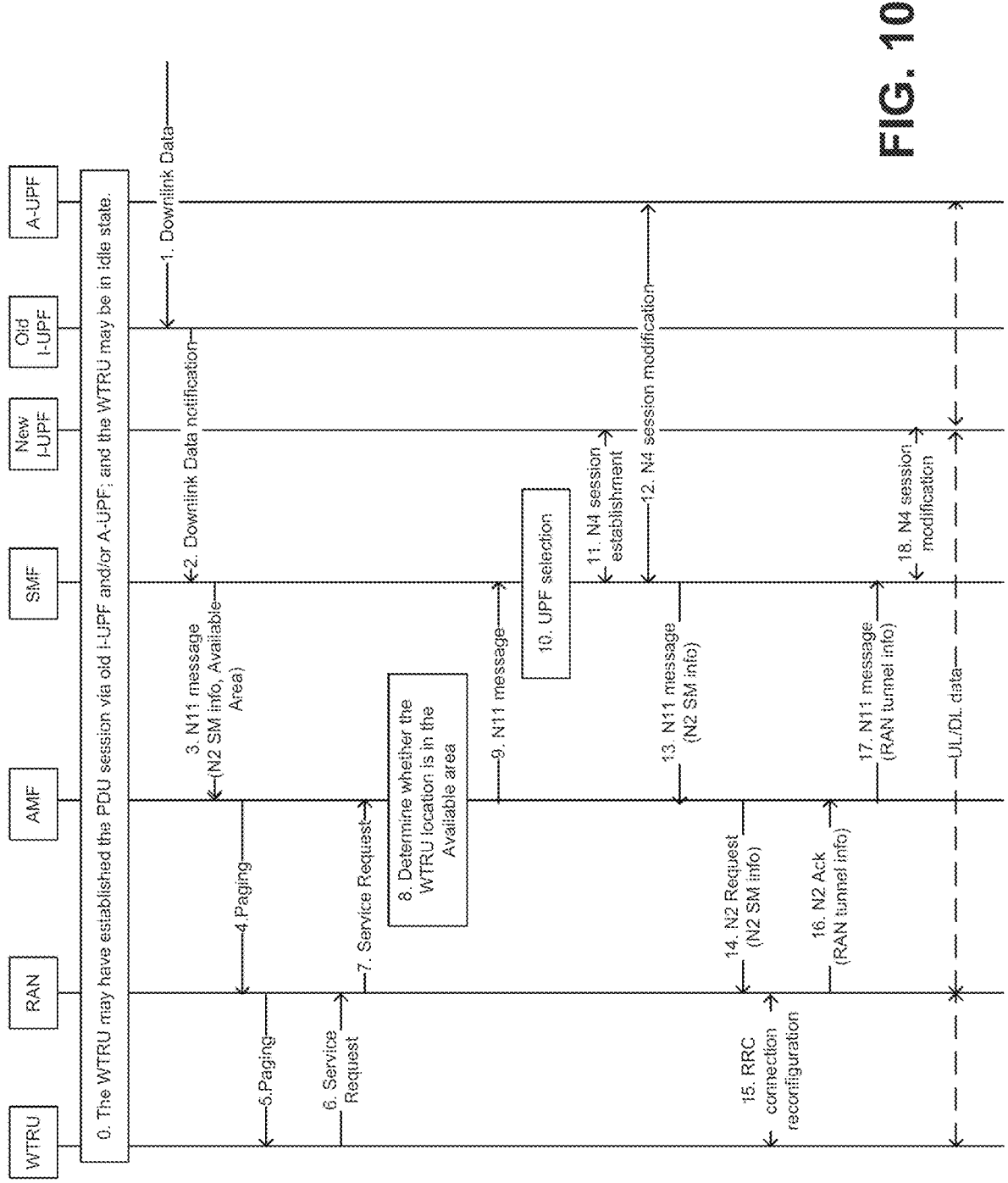
FIG. 10 illustrates an example UPF relocation during the network triggered service request procedure.

FIG. 10 illustrates an example of UPF relocation during the network triggered service request procedure. For example, when downlink data notification is received from the I-UPF and if the SMF is unable to determine whether the UPF will be relocated, the SMF may send SM information (e.g., N2 SM information) to the AMF. The SM information (e.g., N2 SM information) may indicate the area of validity for N2 information, and may include the available area (e.g., current I-UPF serving area or a set of tracking area/cell lists). The AMF may receive a service request from the WRU (e.g., after the paging) and the AMF may determine whether the WTRU is located in the available area of N2 SM information (e.g., based on the WTRU location information determined from the service request). The AMF may determine whether to update the N2 SM information. The AMF may determine to request an updated N2 SM information. The AMF may determine to use N2 SM information received in 3 (e.g., in 8) for the WTRU based on the WTRU location.

If the WTRU is not located within the available area of N2 SM information from the SMF (e.g., if the AMF determines that the WRU is not located within the available area based on the N2 SM information), the AMF may send the WTRU location to the SMF and may request an updated N2 SM information from the SMF (e.g., via one or more of 9-13 from FIG. 10).

If the WTRU is located in the available area of N2 SM information (e.g., if the AMF determines that the WTRU is located within the available area based on the N2 SM information (e.g., received in 3)), the AMF may forward the N2 SM information (e.g., may send a N2 request (e.g., that may include N2 SM information in 14)) to the RAN (e.g., 14 (e.g., skipping 9-13)). The WTRU and the RAN may establish a radio resource control (RRC) connection (e.g., at 15), and establish a tunnel from the A-UPF to the new I-UPF for data packets.

Comparing the procedure of FIG. 10 to FIG. 9, many elements are similar. Comparing the procedure of FIG. 10 to FIG. 9, 3 and 8 are different. For example, in FIG. 10 (e.g., at 3), the SMF may include N2 SM information (e.g., old I-UPF tunnel information) and/or related available area (e.g., old I-UPF node serving area, a WTRU tracking area, or a RAN cell coverage area). For example, in FIG. 10 (e.g., at 8), the AMF may determine whether the N2 SM information is available for the WTRU based on the WTRU location.

In an example, the AMF may receive the UPF service area information from the SMF at the time of the PDU session establishment. The AMF may store the UPF service area information with the corresponding PDU session ID. The AMF may use the saved UPF service area information during the service request procedure to determine if the WRU is located in the UPF service area (e.g., as shown in 8 in FIG. 10) to determine whether the N2 SM information received (e.g., in 3) is available for the WTRU based on the WTRU location. If the WTRU is not located in the received UPF service area, the AMF may request a new SM information (e.g., N2 SM information) from the SMF (e.g., via one or more 9-13).

Figure 11:
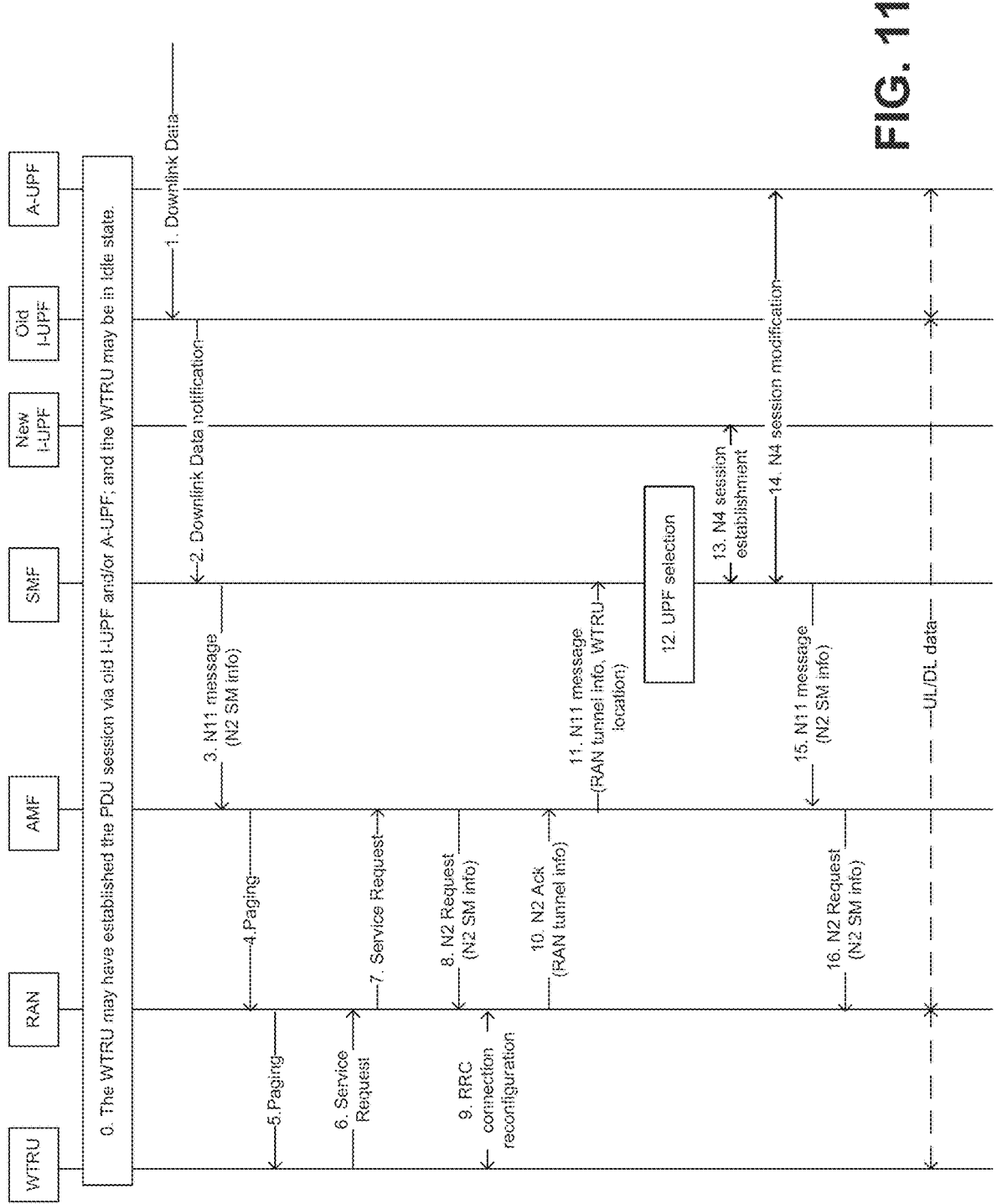
FIG. 11 illustrates an example UPF relocation during the network triggered service request procedure.

FIG. 11 illustrates an example of UPF relocation during the network triggered service request procedure. For example, the SMF may receive a downlink data notification from the I-UPF (e.g., at 2). The SMF may send the SM information (e.g., N2 SM information) to the AMF (e.g., via a N11 message; 3). A WTRU may be paged (e.g., 4-5). The AMF may receive a service request from the WTRU (e.g., 6-7), and the AMF may forward the SM information (e.g., N2 SM information) to the RAN (e.g., 8). The AMF may provide the WTRU location to the SMF (e.g., at 11). The SMF may determine whether the I-UPF is relocated. If the SMF determines that the I-UPF is relocated, the SMF may notify the RAN about the updated N2 SM information.

As shown in FIG. 11, at 11, the AMF may include WTRU location in the N11 message. When the SMF receives the WTRU location from the AMF (e.g., at 11), the SMF may determine whether to perform I-UPF relocation (e.g., at 12). If the SMF determines that I-UPF is not relocated, one or more of 13-14 may be skipped (e.g., as the new I-UPF may not need to be determined). If the SMF determines that I-UPF is relocated, the SMF may determine new I-UPF based on the WTRU location information (e.g., at 13). The SMF may update the N4 session with the A-UPF (e.g., at 14). When the SMF performs UPF selection (e.g., in at 12), the SMF may include updated N2 SM information (e.g., if any, in 15). For example, the updated N2 SM information may include the tunnel information of the new I-UPF. If the AMF receives a new N2 SM information (e.g., in 15), the AMF may forward the new N2 SM information to the RAN to update the N2 SM information. The RAN node may reply back to the AMF. For example, the RAN node may reply back to the AMF with a N2 acknowledgement (ACK) message when the N2 SM tunnel information is received.

Figure 12:
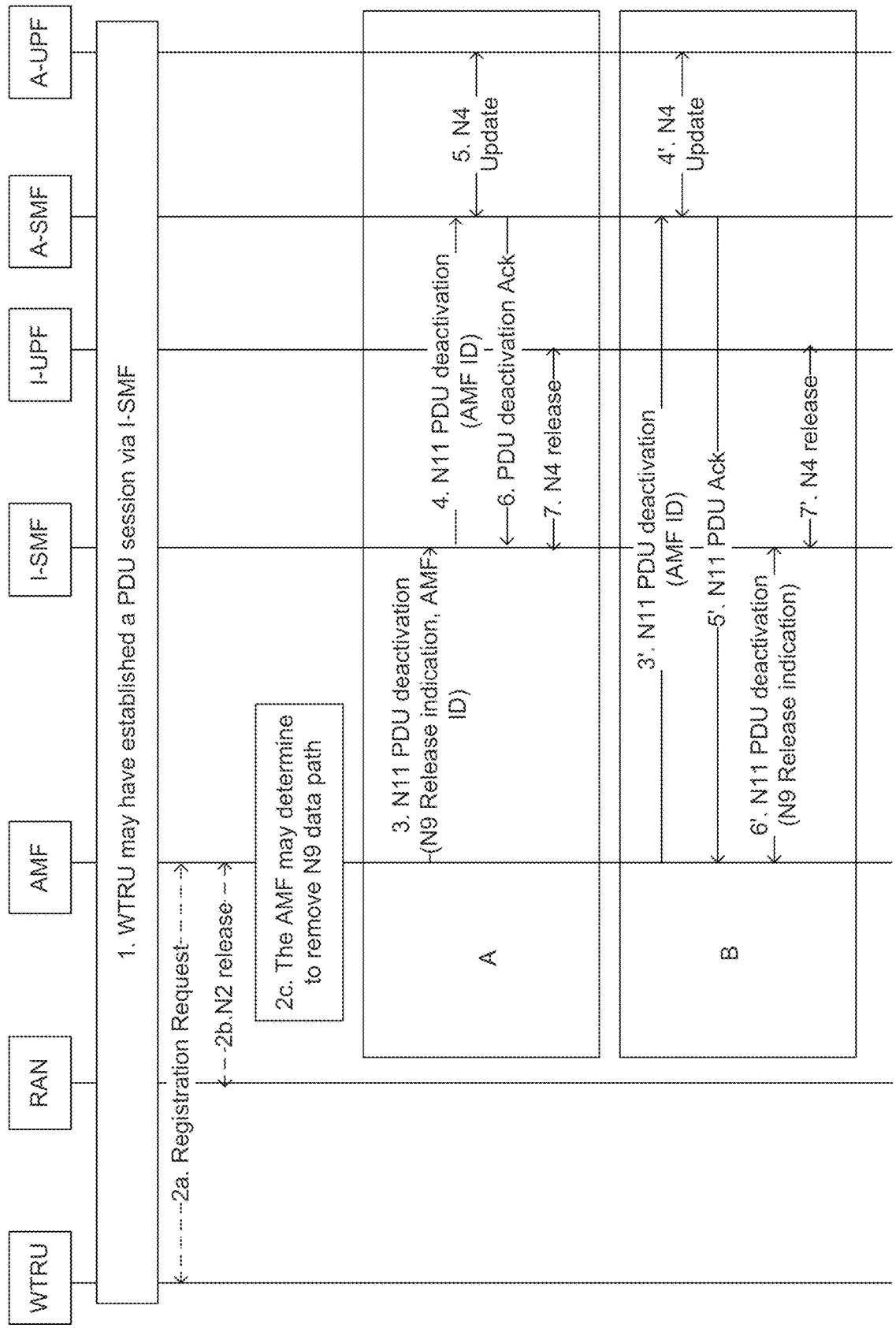
FIG. 12 illustrates an example N9 data path release procedure.

Signaling (e.g., extra signaling) in UPF relocation with SMF change when a WTRU is idle may be reduced. FIG. 12 illustrates an example N9 data path release procedure. For example, the SMF may trigger N9 data path release if the AMF determines that the N9 data path may not be maintained. For example, the WTRU may move out of the I-UPF serving area (e.g., the N9 data path maintenance may be skipped). A N9 release indication may be included in a N11 PDU session deactivation request. The N9 release indication may indicate that the I-SMF to release the N3 data path and/or to release the N9 data path. When the N9 data path is released, extra signaling in the UPF relocation with SMF change (e.g., when the WTRU is idle) may be skipped. The procedure described herein may be available when the AMF selects and/or communicates through an I-SMF (e.g., an architecture such as that described in FIG. 5).

One or more of the following elements may be provided for N9 data path release procedure shown in FIG. 12. A WTRU may establish a PDU session via one or more I-SMFs and/or A-SMFs (e.g., in 1 of FIG. 12). The AMF may determine to release a N9 data path based on the WTRU location (e.g., in 2c). For example, the AMF may release the N9 data path based on the received indication in a registration procedure when the WTRU is idle. The AMF may release the N9 data path based on the WTRU state. The AMF may release the N9 data path when the N2 interface is released. The AMF may release the N9 data path based on one or more local policies.

The AMF may send a PDU session deactivation request (e.g., a N11 PDU session deactivation request) to the I-SMF (e.g., in 3). The N11 PDU session deactivation request may include a release indication (e.g., a N9 release indication). The N11 PDU session deactivation request may include an AMF ID and may be forwarded to the A-SMF. The AMF ID may be used to communicate between A-SMF and AMF (e.g., directly) when the N9 data path is released. The I-SMF may send the N11 PDU deactivation request to the A-SMF (e.g., in 4). The N11 PDU deactivation request may include the AMF ID. When the A-SMF receives the deactivation request message, the A-SMF may store the AMF ID for future communication with AMF (e.g., when N9 data path is released). The A-SMF may modify the N4 session with A-UPF to release N9 data path (e.g., in 5). The A-SMF may send a response to the I-SMF (e.g., in 6). For example, the A-SMF may send a PDU deactivation acknowledgement response to the I-SMF. The I-SMF may modify the N4 session with I-UPF to release one or more (e.g., all) WTRU context, including N9 data path (e.g., in 7). The I-SMF may remove the WTRU context stored in the I-SMF.

The AMF may send a PDU session deactivation request (e.g., N11 PDU session deactivation request) to the A-SMF (e.g., directly), as shown in 3' of FIG. 12. The AMF ID may be included in order to be forwarded to the A-SMF. For example, the A-SMF may communicate with the AMF directly based on the AMF ID when the N9 data path is released. The A-SMF may modify the N4 session with the A-UPF to release N9 data path (e.g., in 4'). The A-SMF may send a response to the AMF (e.g., in 5'). For example, the A-SMF may send a N11 PDU acknowledgement response to the AMF. The AMF may send a N11 PDU session deactivation request to the I-SMF (e.g., in 6'). The N11 PDU session deactivation request may include a N9 release indication. The I-SMF may modify the N4 session with I-UPF to release one or more (e.g., all) WTRU context, including N9 data path (e.g., in 7'). The I-SMF may remove the WTRU context stored in the I-SMF.

Figure 13:
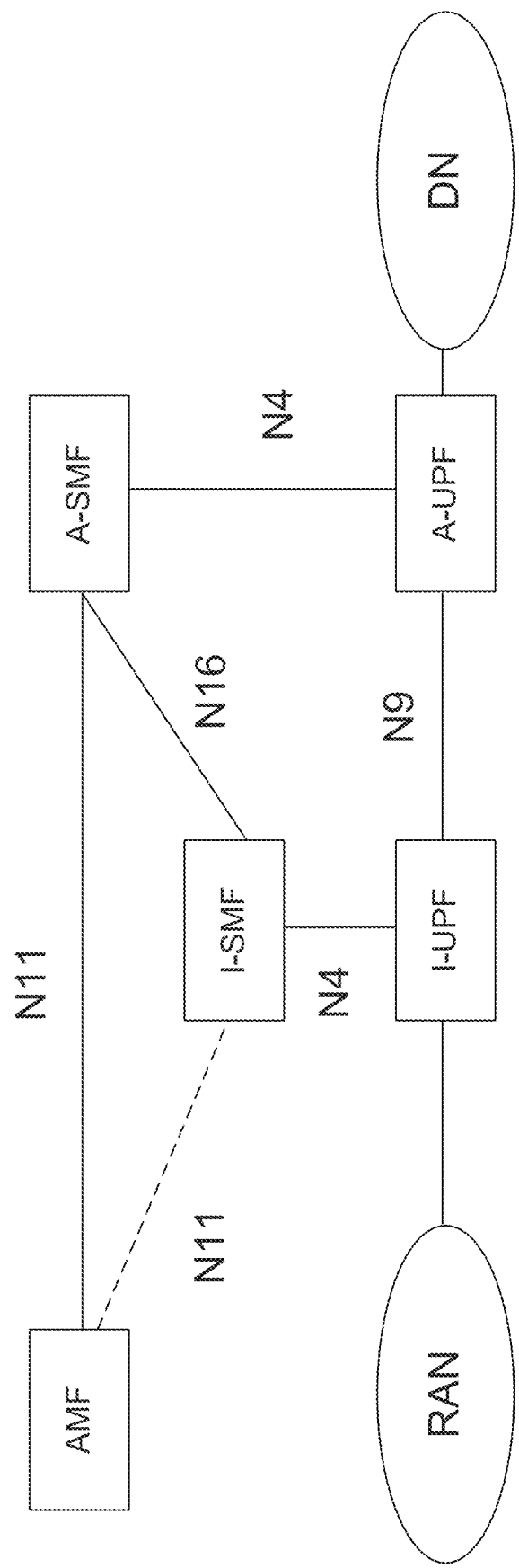
FIG. 13 illustrates an example architecture with one or more SMFs.

FIG. 13 illustrates an example architecture with one or more SMFs. For example, the AMF may communicate with A-SMF and/or I-SMF. During a PDU session establishment, registration procedure, and/or AMF relocation procedure, an AMF ID may be provided to A-SMF and/or I-SMF. The A-SMF and/or I-SMF may be aware of the AMF ID (e.g., as shown in FIG. 12). The architecture shown in FIG. 13 may allow A-SMF and/or I-SMF to interact with the AMF for a particular PDU session. The AMF ID may be passed on to A-SMF and/or I-SMF. One or more of the following procedures may be performed to communicate with the AMF ID to A-SMF and/or I-SMF.

Figure 14:
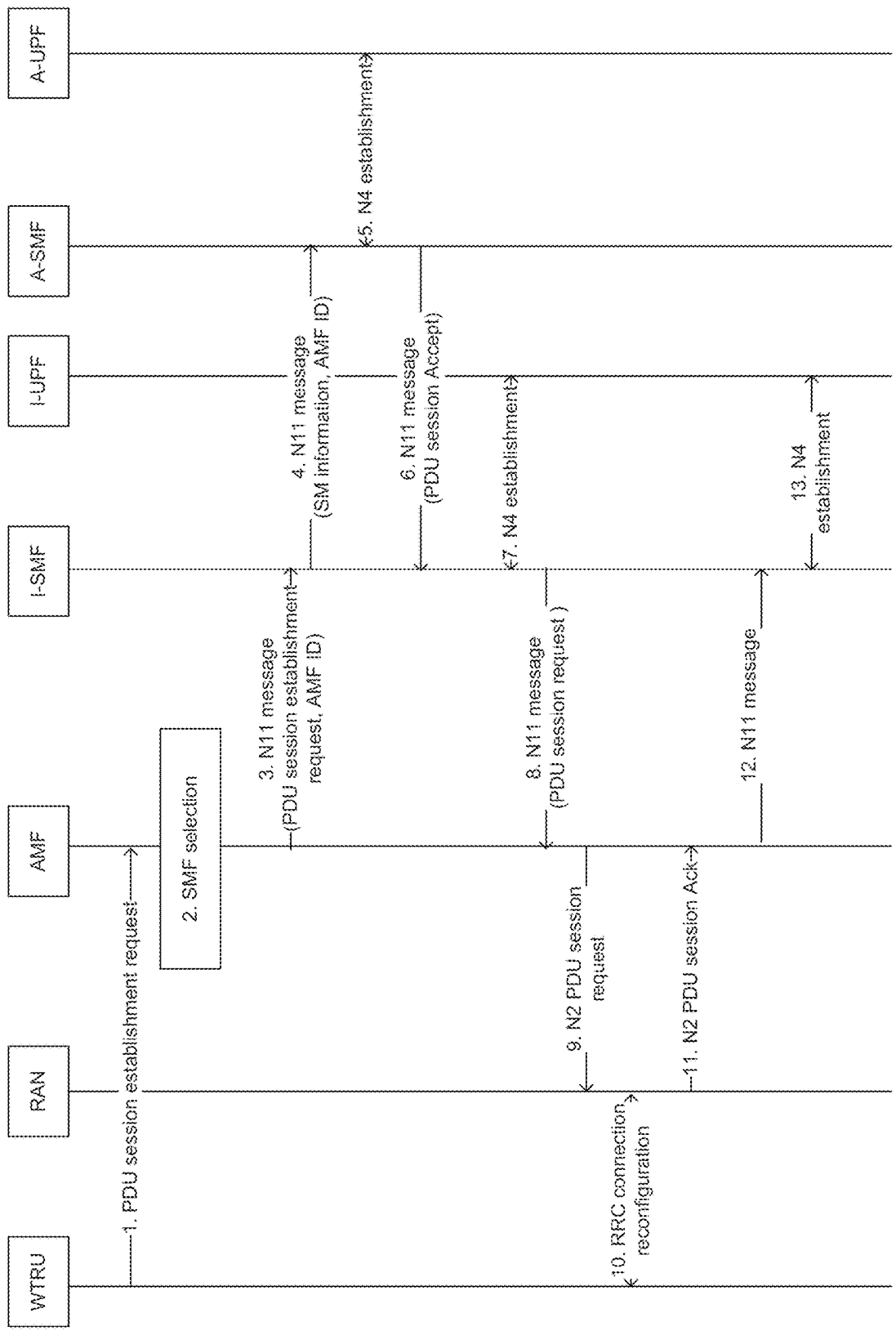
FIG. 14 illustrates an example AMF ID provided to the A-SMF via I-SMF.

FIG. 14 illustrates an example AMF ID provided to an A-SMF via an I-SMF. For example, the AMF ID may be provided to the I-SMF (e.g., first) and may be provided to the A-SMF. The WTRU may generate a PDU session establishment request (e.g., 1 of FIG. 14). The PDU session establishment request may include a PDU session ID and/or service and session continuity (SSC) mode. The AMF may perform the SMF selection to select A-SMF and/or I-SMF (e.g., 2). The AMF may send a PDU session establishment request to the I-SMF in a N11 message (e.g., 3). The AMF may include the AMF ID in the message. The I-SMF may send a PDU session related SM information and/or the AMF ID to the A-SMF (e.g., 4). The A-SMF may store the AMF ID for future communication with AMF directly. The A-SMF may establish a session (e.g., a N4 session) with the A-UPF (e.g., 5 of FIG. 14). A PDU session establishment accept message may be sent back to the I-SMF (e.g., 6). The I-SMF may establish a session (e.g., N4 session) with the I-UPF (e.g., 7). A tunnel between the RAN and I-UPF may be established (e.g., 8-11).

Figure 15:
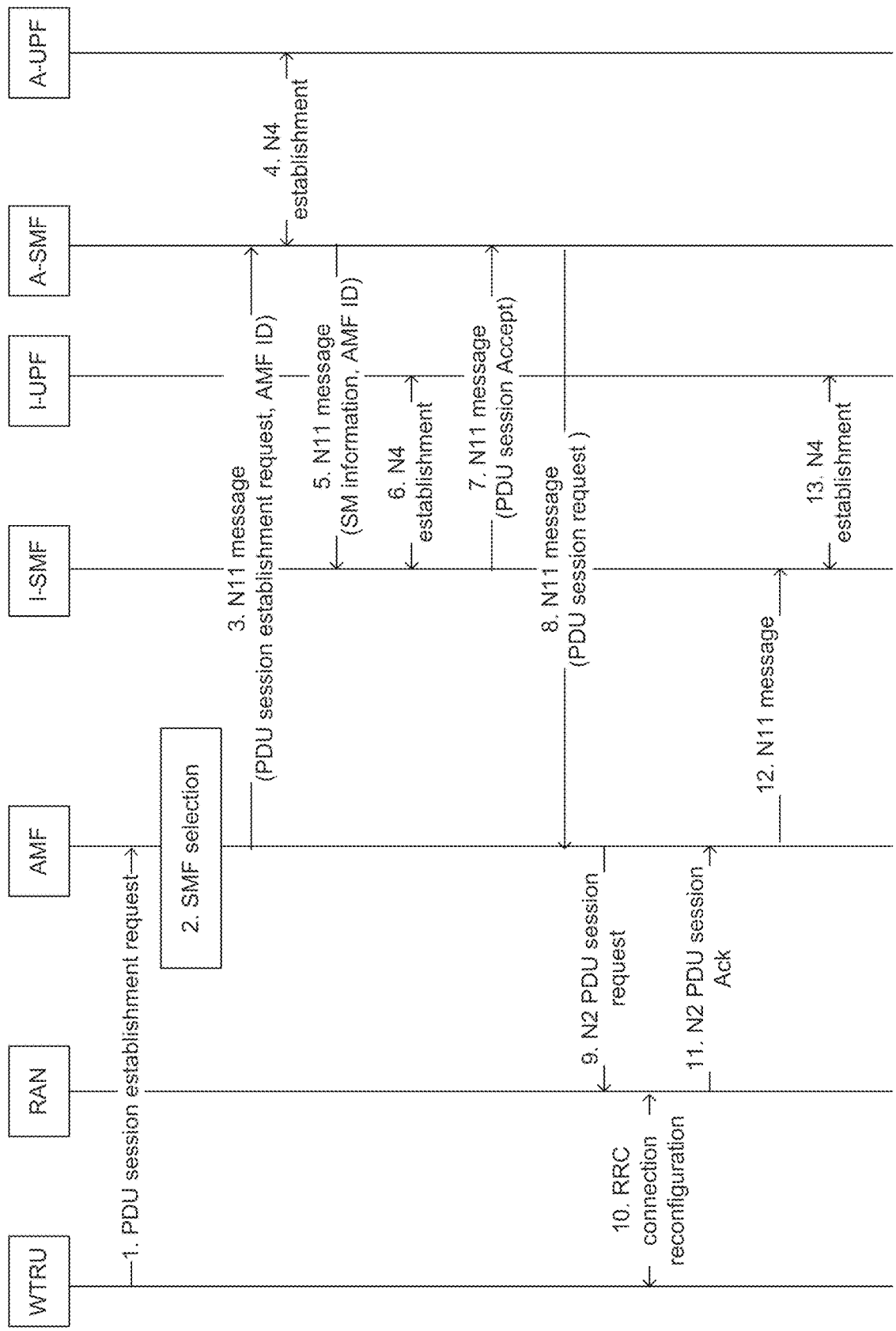
FIG. 15 illustrates an example AMF ID provided to the A-SMF via I-SMF.

FIG. 15 illustrates an example AMF ID provided to the A-SMF via I-SMF. For example, the AMF ID may be provided to the A-SMF first and may be provided to the I-SMF. One or more elements shown in FIG. 15 may be the same as one or more elements shown in FIG. 14 (e.g., except AMF ID may be provided to the A-SMF first, and the AMF ID may be provided to the I-SMF.).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU (e.g., UE), terminal, base station, RNC, or any host computer.

What is claimed is:

1. A first network node, the first network node comprising:
a processor and a transmitter/receiver unit, the processor and the transmitter/receiver unit configured to:
send a session management (SM) information to a second network node, wherein the SM information indicates an area of validity for session information;
receive from the second network node a request for updated SM information, wherein the request includes an indication of a wireless transmit receive unit (WTRU) location;
update the SM information based on the indication of the WTRU location; and
send the updated SM information to the second network node.

2. The first network node of claim 1, wherein the area of validity for the session information is one or more of a user plane function (UPF) node serving area, a WTRU tracking area, or a radio access network (RAN) cell coverage area.

3. The first network node of claim 1, wherein the area of validity for the session information is an intermediate UPF node serving area.

4. The first network node of claim 3, wherein the processor is further configured to perform a relocation to an intermediate UPF based on the WTRU location.

5. The first network node of claim 3, wherein the updated SM information includes information of a further intermediate UPF node serving area.

6. The first network node of claim 1, wherein the session information comprises an N2 information, and wherein the SM information comprises N2 SM information.

7. The first network node of claim 1, wherein the first network node is a session management function (SMF) node and the second network node is an access control and mobility management function (AMF) node.

8. A method implemented by a first network node, the method comprising:
sending a session management (SM) information to a second network node, wherein the SM information indicates an area of validity for session information;
receiving from the second network node a request for updated SM information, wherein the request includes an indication of a wireless transmit receive unit (WTRU) location;
updating the SM information based on the indication of the WTRU location; and
sending the updated SM information to the second network node.

9. The method of claim 8, wherein the area of validity for the session information is one or more of a user plane function (UPF) node serving area, a WTRU tracking area, or a radio access network (RAN) cell coverage area.

10. The method of claim 8, wherein the area of validity for the session information is an intermediate UPF node serving area.

11. The method of claim 10, further comprising performing a relocation to an intermediate UPF based on the WTRU location.

12. The method of claim 10, wherein the updated SM information includes information of a further intermediate UPF node serving area.

13. The method of claim 8, wherein the session information comprises an N2 information, and wherein the SM information comprises N2 SM information.

14. The method of claim 8, wherein the first network node is a session management function (SMF) node and the second network node is an access control and mobility management function (AMF) node.

* * * * *